J. M. DAVIDSON.
PROCESS FOR SEPARATING DETRITUS FROM LIQUIDS.
APPLICATION FILED JAN. 7, 1914.
1,138,634.
Patented May 11, 1915.
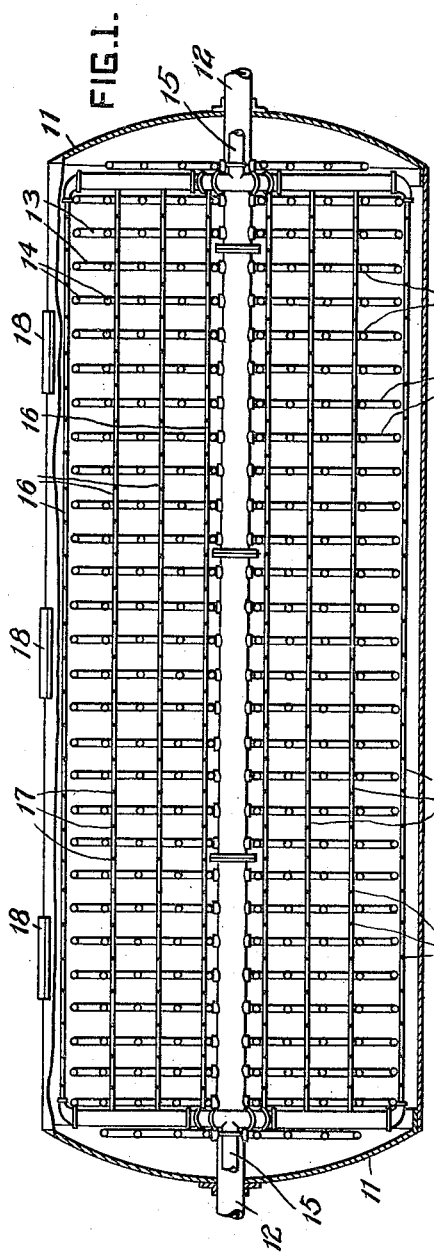
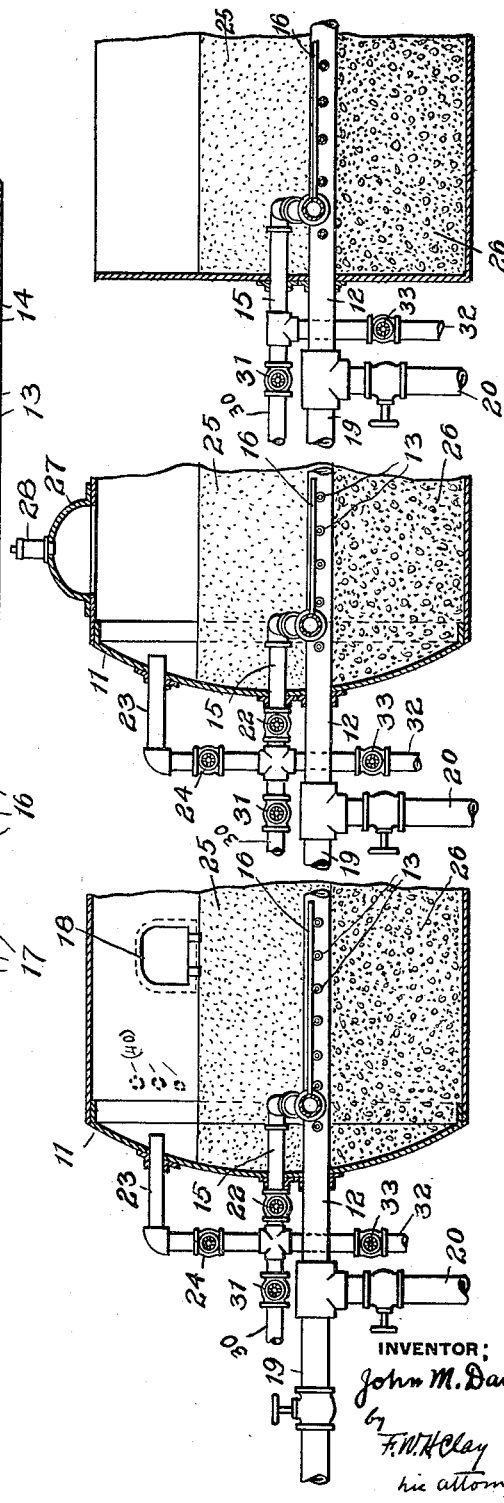
WITNESSES
J. Herbert Bradley.
Jo Baily Brown
INVENTOR:
John M. Davidson
by
F.W.H. Clay
his attorney

UNITED STATES PATENT OFFICE.

JOHN M. DAVIDSON, OF PITTSBURGH, PENNSYLVANIA, ASSIGNOR TO WM. B. SCAIFE & SONS COMPANY, OF PITTSBURGH, PENNSYLVANIA, A CORPORATION OF NEW JERSEY.

PROCESS FOR SEPARATING DETRITUS FROM LIQUIDS.

1,138,634.    Specification of Letters Patent.    Patented May 11, 1915.

Application filed January 7, 1914. Serial No. 810,793.

*To all whom it may concern:*

Be it known that I, JOHN M. DAVIDSON, a citizen of the United States, residing at Pittsburgh, in the county of Allegheny, State of Pennsylvania, have invented a certain new and useful Process for Separating Detritus from Liquids, of which the following is a specification.

My invention relates to the art of separating and removing the insoluble matter from sewage or other waste-carrying liquid discharges, and is particularly designed to provide for allowing the liquid part of the waste to pass through a filtering medium, which is kept in a constantly porous condition by a reverse flow of fluid through the medium.

A further object is to provide for separating and saving the detritus from sewage, and the conversion of such detritus into a form which may be easily handled and saved for subsequent use.

The many other advantages incident to my process will be apparent to those familiar with the art.

I have shown in the accompanying drawing a convenient construction of apparatus for carrying out my process.

Figure 1 is a horizontal section through the sewage tank, showing the arrangement of piping underneath the filter, and connections thereto. Fig. 2 is a broken longitudinal vertical section through the end of the closed filter tank, showing the arrangement and connection of piping thereto. Fig. 3 is the same as Fig. 2, with an additional showing of an air chest at the top of the tank with a pressure valve therein. Fig. 4 shows the piping connection as used for an open tank receptacle.

In plants where raw material has to be washed, such as fabric and cordage mills, slaughter houses, glue factories, and the like, it has been a serious problem to dispose of the sewage water. This is because there is a large amount of insoluble waste. In many cases sanitary requirements make it imperative that the detritus shall be removed from the water before it is discharged into nearby streams, sewers, etc. In other cases, such, for example, as slaughter houses, the insoluble waste is of considerable value for use as a fertilizer. In either case there has been considerable difficulty in properly disposing of this insoluble matter. It has been found that when it is attempted to force the mixture through a filter, the filter medium soon becomes clogged by the waste collecting on its surface, and so requires frequent removals of the waste, or renewals of the filter medium.

My process avoids the previously existing difficulties, and its operation is as follows: I may use either a closed or an open tank containing a filter at the bottom. In the closed tank I pump the mixture to be separated in at the top, keeping a contant pressure thereon. The liquid portion naturally tends to pass through the porous medium and out the drain pipes provided therefor underneath the filter. In order to prevent the insoluble portion of the mixture from collecting in the form of an impervious cake on top of the filtering medium, I force a constant stream of air or other fluid, such as steam, through a separate set of pipes arranged underneath the filter medium. This fluid passes upward through the filter, thus serving to keep it stirred up and porous, and above the filter agitates the mixture of liquid and detritus and prevents the forming of a cake which tends to collect there. This has the effective result of constantly stirring the mixture above the filtering medium and of allowing the liquid part thereof to pass freely through the filtering medium. After a considerable amount of the mixture has been pumped into the tank, and a corresponding amount of liquid has passed through the filter, there will be a very thick mixture left above the filter bed. When the proper stage of thickness is reached, I shut off the supply of mixture, and force air into the tank, either above the surface of the liquid, or upwardly through the filter bed, until all of the liquid is forced out of the tank, leaving the residue in the form of a cake on top of the filter bed. In order to dry this resulting cake more quickly, instead of applying pressure I may force steam upwardly through the filter bed and through the thick mixture of liquid and solid above until it has been dried out. Whether I make the final separation after closing the tank to the supply of mixture, by forcing air in at the top, or by forcing air into the bottom, or by forcing steam in at the bottom, or by any of the other means in which my process may be practised, there will result a cake of solid waste upon the top of the filtering bed. As soon as this is dried out sufficiently it is cut into pieces of convenient size and removed from the tank, for such use or disposal as is desired. In case I use steam to dry out the solid residue, I find it preferable to use a tank completely open at the top. This because the parts cool more quickly and allow access to remove the cake of residue, and because it is more convenient to men removing the cake. The only difference in my process in the case of use with an open tank is that instead of forcing the mixture to be separated in under pressure, it is simply poured in at the top of the tank, and allowed to stand over the filtering medium. After the mixture becomes thick, the supply is shut off, the clear water at the top is drawn off, and steam or air forced up through the filter until the solid residue alone remains.

In the drawings I have shown a form of apparatus by which my process may be practised, though many modifications and changes may be made.

Fig. 1 shows a horizontal section through the filter tank 11, in a plane just beneath the filter medium. I provide a draw-off pipe 12 just beneath the filter, which has parallel branches 13 extending horizontally across the tank on each side of the main pipe 12. At intervals in these branch pipes, I provide strainer openings 14. A separate pipe 15 is provided, which extends across the end of the tank, and which has longitudinal branches 16 running the complete length of the main tank, either just above or just below the branch pipes 13, and having at intervals small openings 17. I provide manholes 18 in the side of the tank.

Referring to Fig. 2, the pipe 12 is shown with two connections, 19 and 20, each having a valve therein. The pipe 15 has a valve 22 therein, and above, a connection 23 to the main tank, with a valve 24. The pipe 15 is connected to an air pressure supply by pipe 30, having a valve 31, and to a steam source by pipe 32, having a valve 33.

In Fig. 3, a raised air chest 27 is shown with an automatic pressure valve 28 at the top thereof.

Referring to Fig. 1, the mixture of liquid and solid matter is pumped in at the top of the tank, the liquid portion passing downwardly through the filter and through the strainer nozzles 14 into the branch pipes 13 and the main pipe 12, and out through the discharge opening (20). A supply of air is constantly forced in through the pipe 15 and is discharged up through the filter medium by openings 17 in the pipes 16. In case a very long tank is used, I provide connections to pipes 12 and 15 at both ends of the main tank, as shown in Fig. 1.

Referring to Fig. 2, which shows a closed tank, the valve in pipe 19 is normally closed, and the discharge from pipe 12 passes outwardly through the connection 20. At the same time, valves 24 and 33 are closed, valves 22 and 31 are open and air is being forced through pipe 15 and its branches upward throughout the entire filter. (This air collects in the chamber 27 and escapes intermittently through the automatic pressure valve 28. This valve 28 is also provided with means for permanently closing it.) When the mixture has become thick, I shut off the supply and close the valve 22, thus stopping the passage of air upwardly through the filter, and open the valve 24, thus admitting pressure of air above the sewage mixture. This tends to force the liquid through the filter and to leave the detritus in a cake on the top of the filter medium. Or, I may close valve 31, thus entirely shutting off the air supply, open the valve 33, which connects to a supply of steam. The hot steam passing upwardly through the filter will soon dry out the moisture contained in the mixture above it. Or, I may close the valve in pipe 20, open the valve in pipe 19, and through it force a supply of water upward through the filter. This would be used in case of a clogging of some of the discharge pipes.

In Fig. 4 an open tank is shown. The connections differ only in that the air inlet has but one connection, and that is to the longitudinal pipes 16. The practice of my process is substantially the same either with an open or a closed tank, and whether the one or the other is preferable depends on the nature of the waste to be separated.

Having thus described and illustrated my invention, I claim:

1. The process of saving detritus out of a liquid by filtering the liquid downward through a filter bed, meantime preventing the packing of solid detritus on top of the filter by agitating it with a gas flowing up through the filter, and reversing the flow of gas to dry the solid on top the filter, substantially as described.

2. The process of concentrating a mixture of liquid and solids above a filter medium through which only the liquid portion can pass, by forcing an opposite flow of a lighter fluid through the filter medium in opposition to the flow of liquid, to prevent packing of detritus on the filter medium surface, and after a sufficient amount of detritus is collected reversing the flow of the lighter fluid through the filter whereby to dry out the collected cake of detritus.

3. The process of concentrating a mixture of liquid and solids above a filter medium through which only the liquid can pass, by forcing the liquid through the filter under pressure while simultaneously forcing a lighter fluid through said filter in the opposite direction, to prevent choking of the filter medium, and intermittently stopping the supply of mixture to be filtered, and forcing the remaining liquid through the filter by means of pressure from above, and then of drying the resulting cake of detritus by means of steam forced through the filter in reverse direction.

4. The process of separating detritus from liquid consisting in collecting the mixture above a filtering medium through which only the liquid can pass, of continuously agitating the mixture by means of an opposite flow of air through the filter, intermittently stopping the collection above the filter and changing the counter flow of air to a heated gas, whereby to dry out the detritus collected on the filter surface.

5. The process of separating detritus from liquids consisting in collecting the mixture above a granular filter through which only the liquid can pass, and forcing a flow of a heated lighter fluid through the filter in opposition to the liquid whereby to prevent packing on the filter surface and to dry out the collected detritus.

6. The process of separating solid waste from liquid consisting in collecting the mixture above a granular filter through which only the liquid can pass, of forcing the liquid through the filter under pressure while simultaneously forcing a lighter fluid through the filter in the opposite direction to prevent packing on the filter surface, and intermittently stopping the supply of mixture to be filtered, and then drying the collected detritus by means of heated fluid forced through the filter in either direction.

In testimony whereof I have hereunto signed my name in the presence of the two subscribed witnesses.

JOHN M. DAVIDSON.

Witnesses:
Jo. BAILY BROWN,
FRED L. STAUB.

Copies of this patent may be obtained for five cents each, by addressing the "Commissioner of Patents, Washington, D. C."